(12) United States Patent
Hirayama et al.

(10) Patent No.: US 9,243,903 B2
(45) Date of Patent: Jan. 26, 2016

(54) WRINKLE DETECTION DEVICE AND WRINKLE DETECTION METHOD

(75) Inventors: Mitsuru Hirayama, Isehara (JP);
Hidehiko Takahashi, Atsugi (JP)

(73) Assignee: NISSAN MOTOR CO., LTD., Yokohama-shi (JP)

( * ) Notice: Subject to any disclaimer, the term of this patent is extended or adjusted under 35 U.S.C. 154(b) by 0 days.

(21) Appl. No.: 14/009,286

(22) PCT Filed: Mar. 19, 2012

(86) PCT No.: PCT/JP2012/057017
§ 371 (c)(1),
(2), (4) Date: Oct. 1, 2013

(87) PCT Pub. No.: WO2012/137594
PCT Pub. Date: Oct. 11, 2012

(65) Prior Publication Data
US 2014/0185058 A1 Jul. 3, 2014

(30) Foreign Application Priority Data

Apr. 7, 2011 (JP) .................................. 2011-085793

(51) Int. Cl.
*G01B 11/30* (2006.01)
*G01B 11/25* (2006.01)

(52) U.S. Cl.
CPC ................ *G01B 11/30* (2013.01); *G01B 11/25* (2013.01); *G01B 11/306* (2013.01)

(58) Field of Classification Search
CPC ...... H01M 8/16; B32B 18/00; B32B 2309/72
USPC .......................... 356/601, 237.1–237.6, 239.1
See application file for complete search history.

(56) References Cited

U.S. PATENT DOCUMENTS

| 6,721,047 B2* | 4/2004 | Shimoda et al. ............ 356/237.5 |
| 7,738,102 B2* | 6/2010 | Kobayashi ........... G01N 21/958 356/237.1 |
| 2002/0036769 A1 | 3/2002 | Shimoda et al. |
| 2009/0141287 A1* | 6/2009 | Sato .................... G01B 11/2536 356/610 |

FOREIGN PATENT DOCUMENTS

| EP | 1 925 908 A1 | 5/2008 |
| JP | 2000-215870 A | 8/2000 |
| JP | 2001-133233 A | 5/2001 |
| JP | 2003-214828 A | 7/2003 |
| JP | 2007-265863 A | 10/2007 |
| JP | 2009-132524 A | 6/2009 |
| TW | 200714778 A | 4/2007 |

OTHER PUBLICATIONS

Taiwanese Office Action dated Feb. 26, 2014, (4 pgs.).
Supplementary European Search Report dated Sep. 29, 2014, 6 pgs.

* cited by examiner

*Primary Examiner* — Gregory J Toatley
*Assistant Examiner* — Iyabo S Alli
(74) *Attorney, Agent, or Firm* — Foley & Lardner LLP (57) ABSTRACT

A wrinkle detection device (100) includes: a light projector (110) which, while moving relative to a layered body (40) formed by stacking electrodes (50) and separators (60), projects slit light onto an outermost one of the separators (60); a camera (120) which shoots a shape of the slit light on the separator (60); and a control unit (130) which calculates a gradient of the separator (60) on the basis of the shot shape of the slit light, and determines the existence of a wrinkle on the basis of the calculated gradient.

6 Claims, 7 Drawing Sheets

WRINKLE DETECTION DEVICE AND WRINKLE DETECTION METHOD

TECHNICAL FIELD

The present invention relates to a wrinkle detection device and a wrinkle detection method.

BACKGROUND ART

Secondary batteries have been used in various products in recent years. A secondary battery includes a battery element formed by stacking positive electrodes, separators and negative electrodes. In order to form the battery element, the electrodes and the separators are stacked alternately in the order of a positive electrode, a separator, a negative electrode and a separator, for example.

When the separator is stacked on the electrode, the separator is likely to form wrinkles, or to form swells which may develop into wrinkles later. Wrinkles of the separator, if any, make the stacking inhomogeneous, resulting in local application of pressure and variations in the distance between the electrodes. This makes the battery quality worse. For this reason, whether a wrinkle is formed or not is important for evaluating the battery quality. Although the existence of wrinkles can be visually determined, there is still a risk of overlooking wrinkles. In addition, the visual determination is undesirable from a cycle-time viewpoint.

Against this background, a technique has been known in which: a laser beam is emitted onto the surface of the separator; and wrinkles are detected in accordance with the intensity of light reflected off the surface (see Patent Literature 1).

CITATION LIST

Patent Literature

Patent Literature 1: Japanese Patent Application Publication No. 2003-214828

SUMMARY OF INVENTION

Technical Problem

In the invention described in Patent Literature 1, a wrinkle is detected by using size (length, width) as criteria. However, the existence of a precursor to a wrinkle or the existence of a wrinkle which poses an actual problem can be determined from the gradient of its rise, instead of the size (hereinafter, a wrinkle and its precursor will simply be referred to as a wrinkle).

The present invention has been made in view of this situation. An object of the present invention is to provide a wrinkle detection device and a wrinkle detection method which are capable of identifying a wrinkle on the basis of its gradient.

Solution To Problem

One aspect of the present invention is a wrinkle detection device including: a light projector; a shooting unit; and a determination unit. The light projector projects slit light onto the outermost separator while moving relative to a layered body formed by stacking electrodes and separators. The shooting unit shoots the shape of the slit light reflected on the separator. The determination unit calculates a gradient of the separator on the basis of the shot shape of the slit light, and determines the existence of a wrinkle on the basis of the calculated gradient.

Another aspect of the present invention is a wrinkle detection method including: a light projecting step; a shooting step; and a determining step. In the light projecting step, slit light is projected onto an outermost separator while moving relative to a layered body formed by stacking electrodes and separators. In the shooting step, the shape of the slit light reflected on the separator is shot. In the determining step, a gradient of the separator is calculated on the basis of the shot shape of the slit light, and the existence of a wrinkle is determined on the basis of the calculated gradient.

DESCRIPTION OF EMBODIMENTS

Referring to the attached drawings, descriptions will be hereinbelow provided for an embodiment of the present invention. It should be noted that dimensional ratios in the drawings are exaggerated for the sake of explanatory convenience and may differ from actual ratios.

To begin with, brief descriptions will be provided for a configuration of a battery including separators. Here, the separators are targeted for detection of a wrinkle by a wrinkle detection device.

Figure 1:
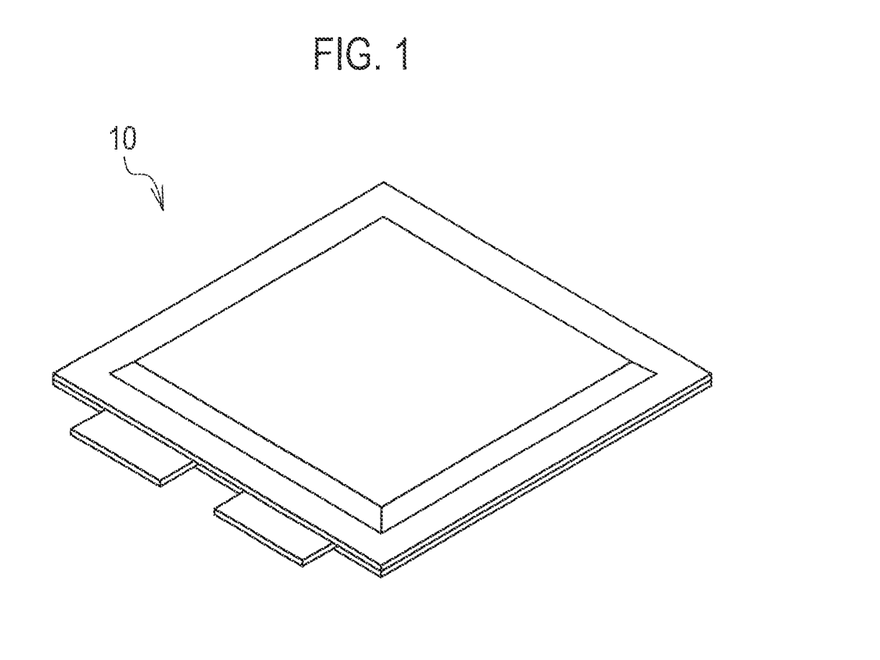
FIG. 1 is a perspective view showing an outer appearance of a lithium-ion secondary battery.
Figure 2:
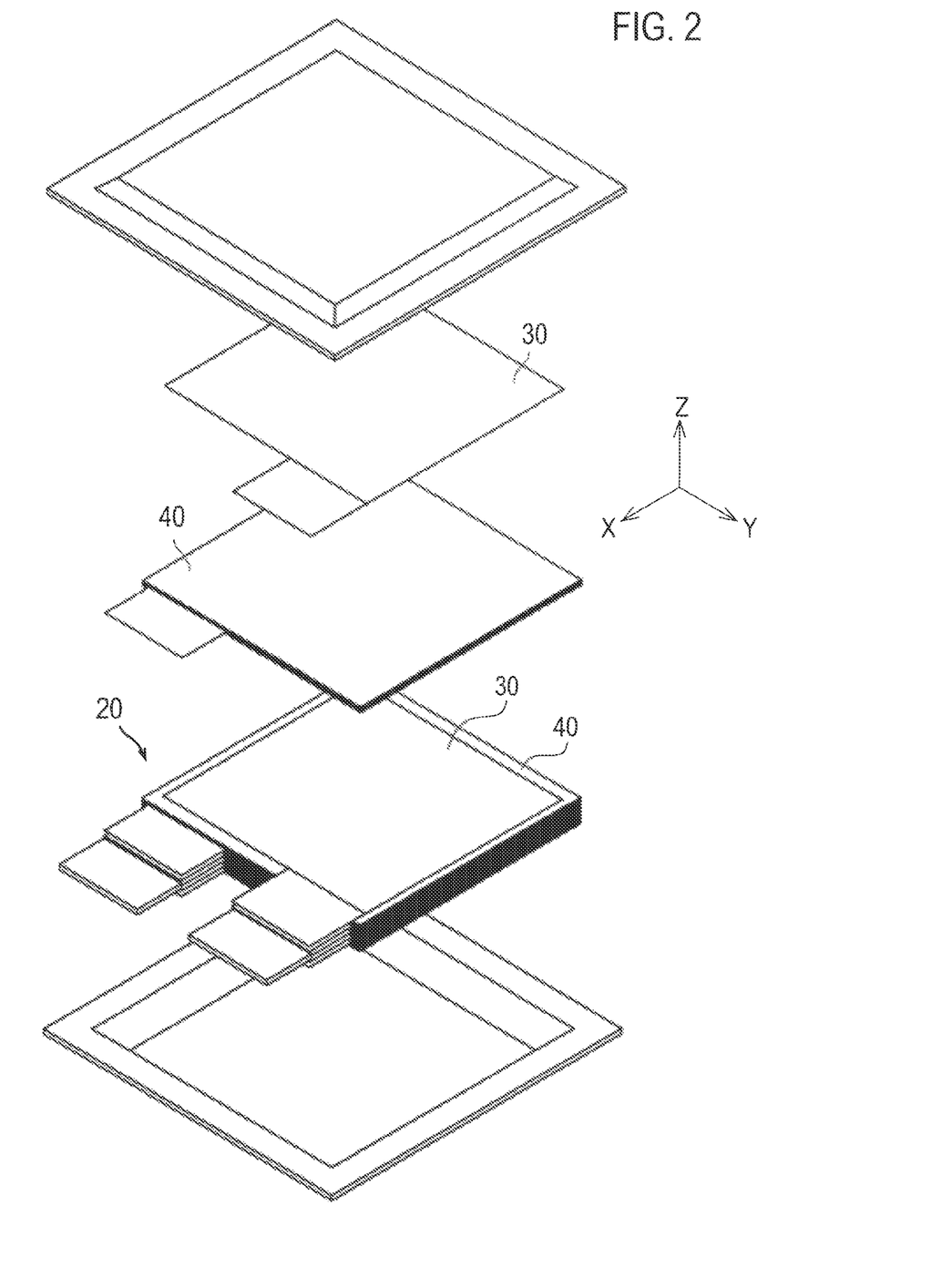
FIG. 2 is an exploded perspective view of the lithium-ion secondary battery.
Figure 3:
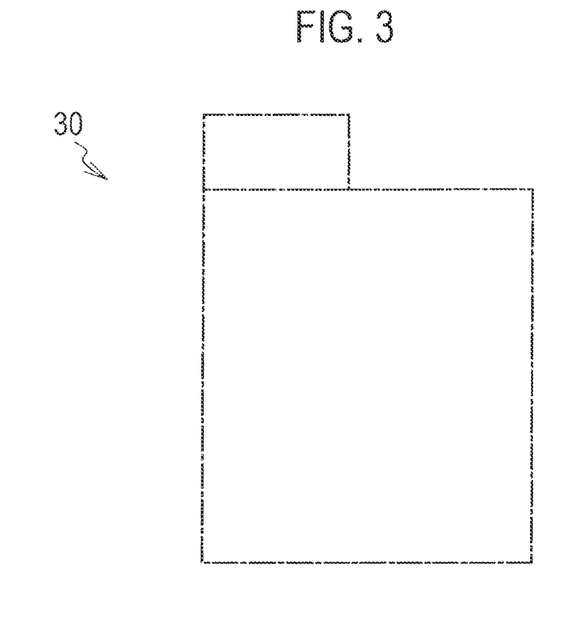
FIG. 3 is a plan view of a negative electrode.
Figure 4:
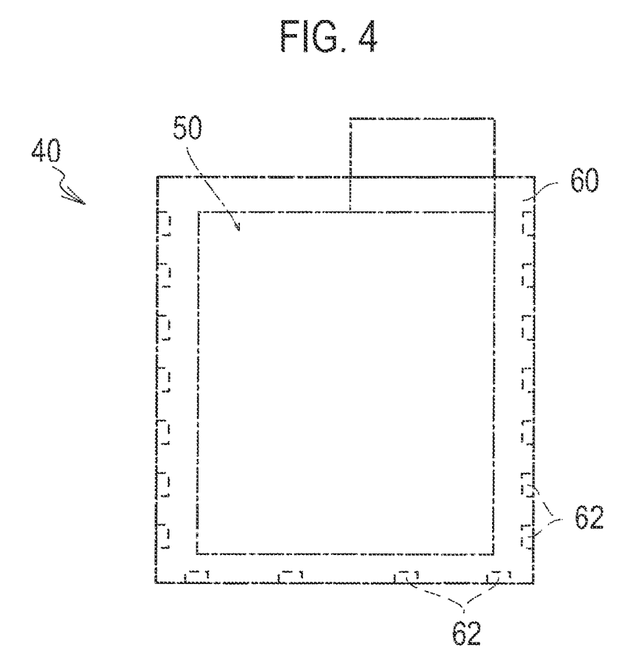
FIG. 4 is a plan view of a packaged positive electrode.

FIG. 1 is a perspective view showing an outer appearance of a lithium-ion secondary battery (a stacked battery). FIG. 2 is an exploded perspective view of the lithium-ion secondary battery. FIG. 3 is a plan view of a negative electrode. FIG. 4 is a plan view of a packaged positive electrode. It should be noted that in a drawing, a Z-direction represents a direction of the stacking or the thickness; an X-direction represents a direction in which the positive electrode tabs and the negative electrode tabs are led out from the exterior material; and a Y-direction represents a direction orthogonal to the Z-direction and the X-direction. In addition, a direction parallel to an XY-plane orthogonal to the Z-direction, or a direction in parallel to a surface of a wrinkle detection target is referred to as a plane direction.

As shown in FIG. 1, a lithium-ion secondary battery 10 is shaped like a flat rectangle. The positive electrode tabs and the negative electrode tabs are led out from the same end portion of the exterior material. A power generation element (a battery element) 20, where charge and discharge reactions progress, is housed in the exterior material.

As shown in FIG. 2, the power generation element 20 is formed by stacking negative electrodes 30 and packaged positive electrodes 40 alternately. As shown in FIG. 3, each negative electrode 30 is made by forming negative electrode active material layers on the two surfaces of a very thin sheet-shaped negative electrode current collector.

Each packaged positive electrode 40 is made by interposing a positive electrode 50 between two separators 60. The positive electrode 50 is made by forming positive electrode active material layers on the two surfaces of a sheet-shaped positive electrode current collector. A tab portion of the positive electrode 50 is led out from a bag which is made from the two separators 60. As shown in FIG. 4, the two separators 60 are formed in the shape of the bag with their respective end potions welded together by welding portions 62. Each welding portion 62 is formed by thermal welding, for example.

It should be noted that a method of manufacturing the lithium-ion secondary battery by stacking the negative electrodes 30 and the packaged positive electrodes 40 alternately is a generally-used lithium secondary battery manufacturing method. For this reason, detailed descriptions of the manufacturing method will be omitted.

Next, descriptions will be provided for a wrinkle detection device.

Figure 5:
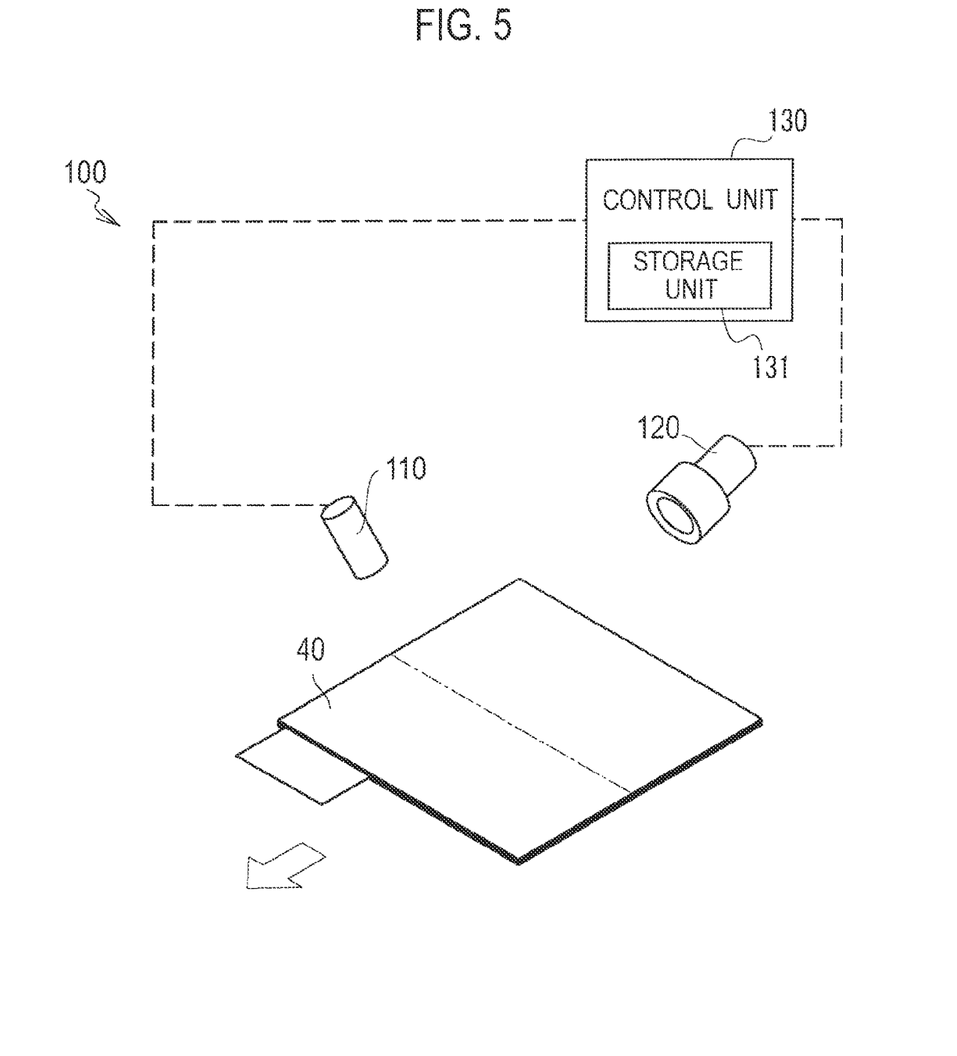
FIG. 5 is a diagram showing a schematic configuration of a wrinkle detection device.
Figure 6:
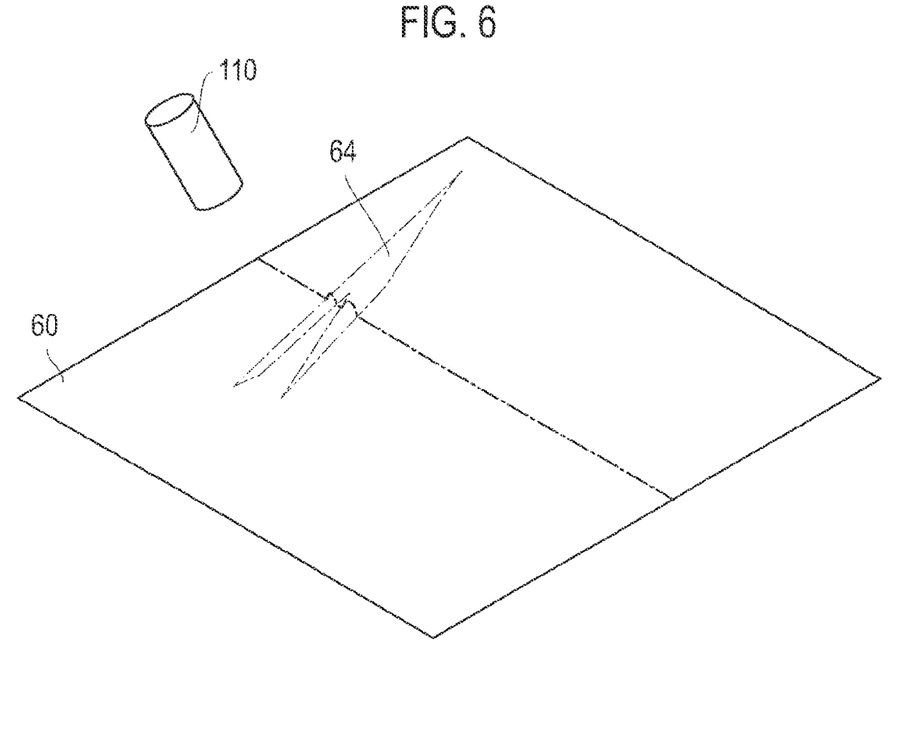
FIG. 6 is a diagram showing how slit light is projected onto a wrinkle in a separator.
Figure 7:
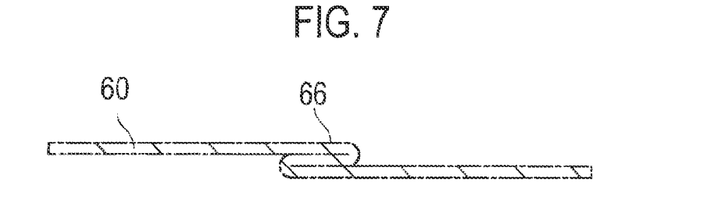
FIG. 7 is a cross-sectional view showing the wrinkle in the separator.

FIG. 5 is a diagram showing a schematic configuration of the wrinkle detection device. FIG. 6 is a diagram showing how slit light is projected onto a wrinkle in a separator. FIG. 7 is a cross-sectional view showing the wrinkle in the separator.

As shown in FIG. 5, a wrinkle detection device 100 includes a light projector 110, a camera 120 and a control unit 130. The light projector 110 projects slit light onto the separator 60. FIG. 5 shows how the slit light is projected onto one of the separators 60 of the packaged electrode 40. The slit light is projected, in the shape of a line, onto the surface of the separator 60, as indicated with a chain dashed line in FIG. 5.

As a shooting unit, the camera 120 diagonally shoots the shape of the slit light projected on the surface of the separator 60. For example, if as shown in FIG. 6, a rise 64 exists on the separator 60, the shape of the slit light viewed from the camera 120 traces the rise 64, and part of the shape corresponding to the rise is accordingly disturbed into a wavy line. The camera 120 shoots the deformation of the slit light by the rise 64. If the rise 64 as shown in FIG. 6 exists there, the rise 64 is more likely to be crushed to a wrinkle 66 in the future. As shown in FIG. 7, the wrinkle 66 is a fold into which part of the surface of the separator 60 is formed. The rise 64 which is more likely to develop into the wrinkle 66 in the future can be detected by using the camera 120.

In addition, if the wrinkle 66 as shown in FIG. 7 is formed in the surface of the separator 60 from the beginning, the shape of the projected slit light changes as well. The camera 120 is capable of shooting both the rise 64 as shown in FIG. 6, which is more likely to develop into the wrinkle 66 in the future, and the folded wrinkle 66 as shown in FIG. 7.

The light projector 110 and the camera 120 move relative to the separator 60 so that the slit light can be sequentially projected onto the entirety of the surface of the separator 60. The direction of their movement is a direction intersecting with a direction in which the projected line-shaped slit light extends on the surface of the separator 60. Their relative movement in the direction intersecting with the slit light makes it possible to project the slit light onto the entirety of the surface of the separator 60, and to shoot the resultant slit light with the camera 120. For example, while the packaged positive electrode 40 is moving by being conveyed, the light projector 110 projects the slit light intersecting with the conveyance direction and the plane direction (in other words, the light projector 110 projects the slit light which extends in a direction intersecting with the conveyance direction on the surface of a wrinkle detection target). It is desirable that the light projector 110 project the slit light which extends in a direction intersecting with the conveyance direction at 90° on the surface of the wrinkle detection target.

As a determination unit, the control unit 130 detects a surface geometry of the separator 60, and determines the existence of a wrinkle on the basis of a gradient of the surface. The wrinkle detection and determination method is as follows. It should be noted that the gradient means an inclination to the plane direction of the surface of the wrinkle detection target.

Figure 8:
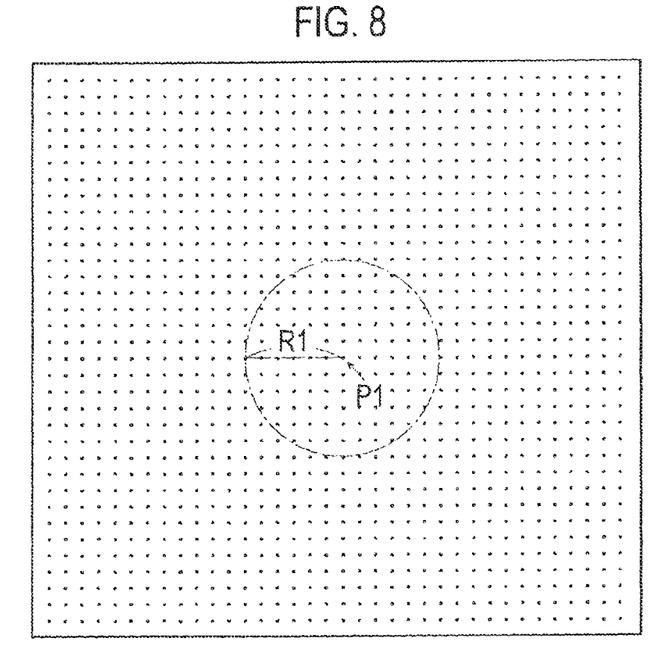
FIG. 8 is a diagram showing how a pixel representing a candidate for a wrinkle is identified.
Figure 9:
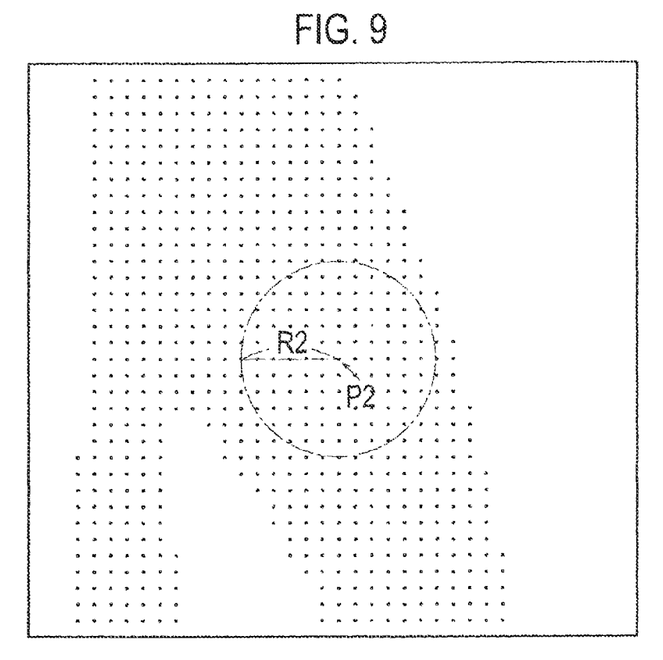
FIG. 9 is a diagram showing how a wrinkle is identified.

FIG. 8 is a diagram showing how a pixel specifying a candidate for a wrinkle is identified, and FIG. 9 is a diagram showing how a wrinkle is identified.

The control unit 130 calculates the cross-sectional shape of a part of the separator 60 onto which the slit light is projected on the basis of the shape of the slit light on the separator 60 shot with the camera 120. This cross-sectional shape includes the elevation of the part of the separator 60. For example, the slit light shown in FIG. 6 takes on a shape reflecting two bulges. On the basis of this shape and the shooting angles of the camera 120, the cross-sectional shapes (elevations) of the part of the separator 60 onto which the slit light are projected are calculated. The surface geometry of the separator 60 is three-dimensionally identified by combining the calculated cross-sectional shapes. This method is called an optical cutting method.

For each image shot with the camera 120, on the basis of the corresponding cross-sectional shape, the control unit 130 associates elevation information with each of the pixels representing the part onto which the slit light is projected, and stores the association in a storage unit 131. After associating the elevation with each pixel, the control unit 130 calculates whether or not a steep gradient exists around each pixel.

For example, as shown in FIG. 8, the elevation of a pixel P1 is compared with the elevations of the respective pixels which are within a radius R1 of the pixel P1. The number of pixels whose elevations are higher or lower by not less than a predetermined threshold value th1 is counted. If the counted number is equal to or greater than a predetermined value th2, many sharp elevation differences exist around the pixel P1. In other words, it is learned that a steep gradient is formed in a wide range. For this reason, the control unit 130 stores the pixel P1 as a candidate for a wrinkle-forming part (a wrinkle candidate). For example, the wrinkle candidate is colored in red, and is stored while distinguished from the other pixels. For each of the pixels representing the separator 60 shot with the camera 120, the control unit 130 determines whether or not the pixel is a wrinkle candidate.

Once completing screening of wrinkle candidates, the control unit 130 then extracts only the wrinkle candidates, as shown in FIG. 9. Thereby, the control unit 130 identifies the range of the wrinkle by using each wrinkle candidate pixel. The identification of the range of the wrinkle is achieved as follows, for example. The control unit 130 counts the number of wrinkle candidate pixels which are within a radius R2 of a wrinkle candidate pixel P2. If the counted number is equal to or greater than a predetermined threshold value th3, the control unit 130 determines that the pixel 2 constitutes a part of the wrinkle, and stores the determination. For each of the wrinkle candidate pixels, the control unit 130 determines whether or not the wrinkle candidate pixel constitutes a part of the wrinkle.

As described above, the wrinkle detection device 100 is capable of determining the existence of the wrinkle by: shooting the surface of the separator 60; associating the elevations with the pixels; and detecting the steep gradient on the basis of the difference in elevation between each pixel and its neighboring pixels. In short, the wrinkle detection device 100 is capable of determining the existence of the wrinkle on the basis of the gradient of the surface of the separator 60. For this reason, in the ensuing steps, it is possible to discard a packaged positive electrode 40 determined to include the wrinkle, and to get rid of a battery including such packaged positive electrode 40 as a defective item.

It should be noted that in the embodiment, the radius R1 is a value which is determined as appropriate by those skilled in the art. When R1 is set at a smaller value, the gradient in a narrower area can be detected. For example, when the inter-pixel distance is in a range of 0.2 mm to 0.3 mm, R1 is in a range of 2 mm to 3 mm. In addition, the threshold values th1, th2 may also be set as appropriate by those skilled in the art. When the radius R1 is set at a smaller value and the quotient of the threshold value th1 divided by the threshold value th2 is set at a larger value, a sharper change in the gradient can be determined as a wrinkle. In this manner, the radius R1 and the threshold values th1, th2 are parameters which constitute the threshold values for determining the existence of the wrinkle. For this reason, when the values of the radius R1 and the threshold values th1, th2 are adjusted, the threshold value of the gradient for determining the existence of the wrinkle can be adjusted. The radius R2 and the threshold value th3 are also values which are determined as appropriate by those skilled in the art. When the radius R2 and the threshold value th3 are adjusted depending on the necessity, the threshold value of the gradient for determining the existence of the wrinkle can be adjusted.

Next, descriptions will be provided for an example of a process to which the wrinkle detection device 100 is applied.

Figure 10:
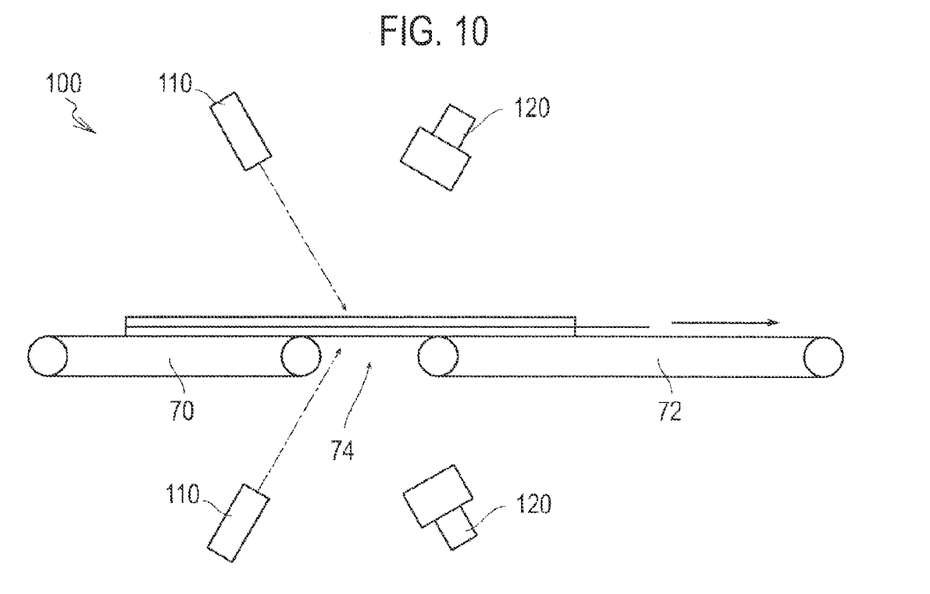
FIG. 10 is a diagram showing how a wrinkle is detected in the separators of a packaged positive electrode conveyed by suction conveyors.

FIG. 10 is a diagram showing how a wrinkle is detected in the separators for a packaged positive electrode conveyed by suction conveyors.

The wrinkle detection device 100 can be applied while the packaged positive electrode 40 shown in FIG. 4 is conveyed after its production. Let us assume that the packaged positive electrode 40 is being conveyed by suction conveyors 70, 72 in a direction indicated with an arrow in the drawing. The suction conveyors 70, 72 produce negative pressure on their respective conveyor surfaces running rotationally, and thus convey the packaged positive electrode 40 while fixing the packaged positive electrode 40 to the suction conveyors 70, 72 by use of the negative pressure. A space 74 is provided between the suction conveyors 70, 72. The negative pressure is released at the opposed end portions of the suction conveyors 70, 72. Thus, the packaged positive electrode 40 is smoothly passed from the suction conveyor 70 to the suction conveyor 72.

The wrinkle detection device 100 includes two light projectors 110 and two cameras 120 which are provided respectively over and under the suction conveyors 70, 72 in the conveyance passage. A wrinkle can be detected in the surface of the top-side separator 60 of the packaged positive electrode 40 by the light projector 110 and the camera 120 on the upper side. In addition, a wrinkle can be detected in the surface of the back-side separator 60 of the packaged positive electrode 40 by the light projector 110 and the camera 120 on the lower side. The angles of the light projector 110 and the camera 120 on the lower side are adjusted in order that: the slit light can be projected onto the surface of the corresponding separator 60 through the space 74 between the suction conveyors 70, 72: and the resultant slit light can be shot.

Even in the case where the packaged positive electrode 40 with the separators 60 placed on the two sides of the packaged positive electrode 40 is employed, a wrinkle can be detected in each of the surfaces of the separators 60 on the two sides by arranging the wrinkle detection device 100 in a way as described above, that the space between the conveyance devices is aimed at on the lower side.

In addition, even in a case where the packaged positive electrode 40 is not employed, the wrinkle detection device 100 is applicable.

Figure 11:
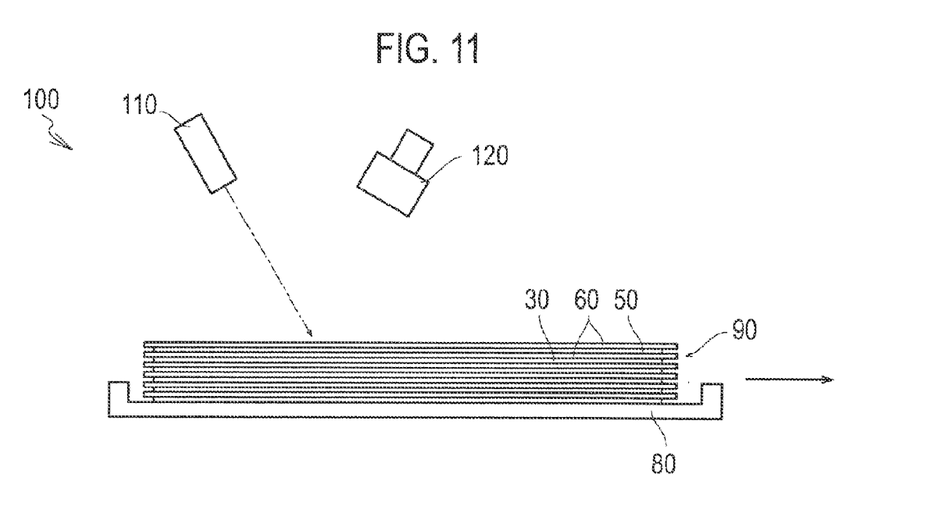
FIG. 11 is a diagram showing how a wrinkle is detected in a separator in a power generation element to be placed on a palette and conveyed.

FIG. 11 is a diagram showing how a wrinkle is detected in a separator in a power generation element which is conveyed while placed on a pallet.

There is a production line in which a stack 90 (power generation element) is formed by sequentially stacking the electrodes (positive electrodes or negative electrodes) and the separators alternately on a pallet 80 which is being conveyed. In this production line, as shown in FIG. 11, the wrinkle detection device 100 is applicable to a process of conveyance with a separator 60 stacked as an uppermost layer (outermost layer). The placement of a light projector 110 and a camera 120 over the stack 90 makes it possible to project the slit light onto the entirety of the surface of the moving separator 60 in full length from the light projector 110 whose orientation is fixed. The sequential shooting of the slit light on the separator 60 by the camera 120 enables the control unit 130 to detect a wrinkle. If the wrinkle detection device 100 is applied to each process of conveyance with a separator 60 stacked as an uppermost layer, detection of a wrinkle can be performed on all the separators 60.

Here, the electrodes and the separators may be alternately stacked on a stationary pallet 80. In this case, the light projector 110 and a camera 120 installed over the pallet 80 move in order that: the slit light can be projected onto the entirety of the surface of each separator 60; and the resultant slit light can be shot. The direction of their movement is a direction intersecting with a direction in which the slit light extends and the plane direction (a direction intersecting with a direction in which the slit light extends on the surface of a wrinkle detection target). It is desirable that the direction of their movement be a direction intersecting therewith at 90°.

As described above, the wrinkle detection device 100 is applicable to various processes in the production line as well.

In the embodiment, as shown in FIG. 8, if there are pixels as many as or more than the threshold value th2, which are located within the radius R1 and have differences in elevation equal to or greater than the threshold th1, the pixel P is identified as a wrinkle candidate; and on the basis of the criteria shown in FIG. 9, a wrinkle is judged from the wrinkle candidates. However, the wrinkle judgment is not limited to this example. A part represented by pixels which satisfy the criteria shown in FIG. 8 may be judged as a wrinkle instead of the wrinkle candidates.

Furthermore, the wrinkle candidate judgment and the wrinkle judgment are based on the evaluation of pixels within the radii of R1 and R2. However, the pixels may be evaluated in a rectangular area or any other polygonal area, instead of in the circular areas with the radii of R1 and R2.

Moreover, the foregoing descriptions have been provided citing the case where each packaged positive electrode 40 is formed by packing the positive electrode 50 with the separators 60. Here, the negative electrode 30 may be packaged with the separators 60 instead. Even in this case, similarly, a wrinkle can be detected in the surface of each separator 60.

What is more, in the embodiment, as shown in FIG. 1, the positive electrode tabs and the negative electrode tabs are led out from the same end portion of the exterior material. However, the invention is not limited to this configuration. For example, the positive electrode tabs and the negative electrode tabs may be led out from opposite end portions, respectively. In this case, the power generation element 20 of the secondary battery 10 is formed by stacking the negative electrodes 30 and the packaged positive electrodes 40 in a way that the negative electrode tabs and the positive electrode tables are located on mutually opposite sides.

Furthermore, in the embodiment, the single line-shaped ray of slit light is projected onto the separators 60. However, the invention is not limited to this configuration. Multiple stripe-shaped rays of slit light may be projected.

Although the foregoing descriptions have been provided for the embodiment, this embodiment is just an example for facilitating the understanding of the present invention and the invention is not limited to the embodiment. The technical scope of the present invention is not limited to the specific technical matters which have been disclosed with regard to the embodiment, but includes various modifications, changes, alternative technologies, and the like which can easily be derived therefrom.

This application claims the benefit of priority on the basis of Japanese Patent Application No. 2011-085793 filed on Apr. 7, 2011, all the contents of which are incorporated herein by reference.

INDUSTRIAL APPLICABILITY

The wrinkle detection device and the wrinkle detection method of the present invention are capable of detecting a wrinkle on the basis of a gradient of a surface of a separator.

REFERENCE SIGNS LIST

10 secondary battery
20 power generation element
30 negative electrode
40 packaged positive electrode
50 positive electrode
60 separator
62 welding portion
70, 72 suction conveyor
74 space
80 pallet
90 stack
100 detection device
110 light projector
120 camera (shooting unit)
130 control unit

The invention claimed is:

1. A wrinkle detection device comprising:
   a light projector configured to, while moving relative to a layered body formed by stacking electrodes and separators, project slit light onto an outermost one of the separators;
   a shooting unit configured to shoot a shape of the slit light projected on the separator; and
   a determination unit configured to calculate an inclination of a surface of the separator, on which the slit light is projected, to a plane direction of the surface on the basis of the shot shape of the slit light, and to determine the existence of a wrinkle on the basis of the calculated inclination.

2. The wrinkle detection device according to claim 1, wherein
   the light projector and the shooting unit are installed in a conveyance passage to convey the layered body, and
   the shooting unit detects a surface geometry of the separator in the layered body.

3. The wrinkle detection device according to claim 1, wherein
   the layered body includes an electrode placed in separators formed in the shape of a bag,
   the light projector projects the slit light on each of two surfaces of the layered body and
   the shooting unit shoots the shape of the slit light on each of the two surfaces of the layered body.

4. The wrinkle detection device according to claim 1, wherein the determination unit
   on the basis of the shot shape of the slit light, associates an elevation with each of pixels representing an image of the separator shot by the shooting unit, and
   determines whether or not each pixel represents part of the wrinkle by comparing the pixel with other pixels within a predetermined area in terms of an elevation difference.

5. A wrinkle detection method comprising:
   projecting, while moving relative to a layered body formed by stacking electrodes and separators, projecting slit light onto an outermost one of the separators;
   shooting a shape of the slit light projected on the separator; and
   calculating an inclination of a surface of the separator, on which the slit light is projected, to a plane direction of the surface on the basis of the shot shape of the slit light, and determining the existence of a wrinkle on the basis of the calculated inclination.

6. A wrinkle detection device comprising:
   means for projecting, while moving relative to a layered body formed by stacking electrodes and separators, slit light onto an outermost one of the separators;
   means for shooting a shape of the slit light projected on the separator; and
   means for calculating an inclination of a surface of the separator, on which the slit light is projected, to a plane direction of the surface on the basis of the shot shape of the slit light, and determining the existence of a wrinkle on the basis of the calculated inclination.

* * * * *